(12) United States Patent
Liem et al.

(10) Patent No.: US 7,327,806 B2
(45) Date of Patent: Feb. 5, 2008

(54) SYSTEM/METHOD FOR RECEIVING ASK AND FSK SIGNALS USING A SINGLE RF RECEIVER

(75) Inventors: Fiean Liem, El Paso, TX (US); Arturo Garcia Roiz, Juarez (ME)

(73) Assignee: Delphi Technologies, Inc., Troy, MI (US)

(*) Notice: Subject to any disclaimer, the term of this patent is extended or adjusted under 35 U.S.C. 154(b) by 618 days.

(21) Appl. No.: 10/827,818

(22) Filed: Apr. 20, 2004

(65) Prior Publication Data

US 2005/0232376 A1  Oct. 20, 2005

(51) Int. Cl.
H04L 25/34 (2006.01)
(52) U.S. Cl. ..................................... 375/322
(58) Field of Classification Search ............... 375/316, 375/322
See application file for complete search history.

(56) References Cited

U.S. PATENT DOCUMENTS

2002/0101340 A1  8/2002  Starkey
2002/0171537 A1  11/2002  Ghabra et al.
2005/0003781 A1*  1/2005  Kunz et al. ............... 455/226.1

FOREIGN PATENT DOCUMENTS

DE  102 33 909  2/2004
EP  1 187 346  3/2002

OTHER PUBLICATIONS

European Search Report dated Jun. 18, 2005.

* cited by examiner

Primary Examiner—David C. Payne
Assistant Examiner—Leon Flores
(74) Attorney, Agent, or Firm—Jimmy L. Funke

(57) ABSTRACT

A system utilizes a single receiver to simultaneously receive and demodulate both amplitude shift keying (ASK) messages and frequency shift keying (FSK) messages. The single receiver is used to demodulate the FSK modulated message and the single receiver provides a received signal strength indicator (RSSI) signal that provides an indication of a combined strength of the FSK and ASK messages. The RSSI signal is filtered and then data sliced to provide a digital message that corresponds to a demodulated version of the ASK modulated message.

16 Claims, 4 Drawing Sheets

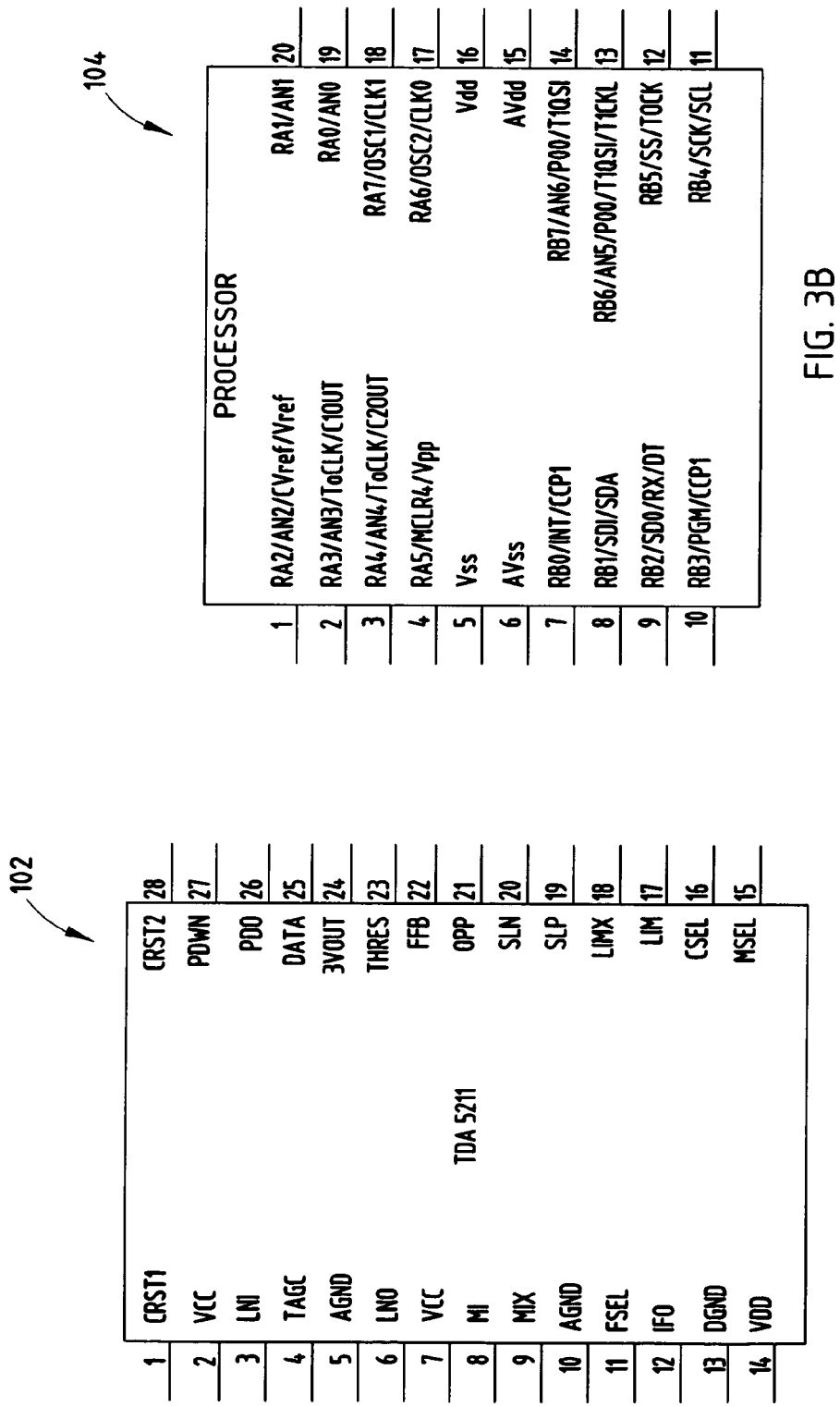

SYSTEM/METHOD FOR RECEIVING ASK AND FSK SIGNALS USING A SINGLE RF RECEIVER

TECHNICAL FIELD

The present invention is generally directed to a communication system and, more specifically, to a communication system that includes a single receiver system that receives amplitude shift keying (ASK) messages and frequency shift keying (FSK) messages simultaneously.

BACKGROUND OF THE INVENTION

Today, increasingly, motor vehicle manufacturers are adding radio frequency (RF) receiver functionality to motor vehicles in order to receive various information, e.g., tire pressure information transmitted from a sensor/transmitter located within a motor vehicle tire. RF receivers for tire pressure monitoring (TPM) systems are similar to RF receivers used in remote keyless entry (RKE) systems, which have been implemented in motor vehicles for approximately a decade. Depending upon the manufacturer, TPM and RKE transmitter and receiver technology may implement a variety of modulation schemes, such as amplitude shift keying (ASK) and frequency shift keying (FSK). Further, motor vehicle manufacturers frequently implement TPM and RKE systems that utilize different modulation schemes within the same motor vehicle. In motor vehicles that have included systems that utilize different modulation schemes, each system has required a different receiver for each of the modulation schemes.

What is needed is a communication system that utilizes a single radio frequency (RF) receiver to simultaneously receive both amplitude shift keying (ASK) and frequency shift keying (FSK) messages.

SUMMARY OF THE INVENTION

According to one embodiment of the present invention, a method and system are disclosed that utilize a single receiver to simultaneously receive and demodulate both amplitude shift keying (ASK) messages and frequency shift keying (FSK) messages. Initially, a first message, which may be a frequency shift keying (FSK) modulated message, and a second message, which may be an amplitude shift keying (ASK) message, are received by the single receiver. The second message is received during at least a portion of the first message and the single receiver is used to demodulate the FSK modulated message. The single receiver also provides a received signal strength indicator (RSSI) signal that provides an indication of a combined strength of the first and second messages. The RSSI signal is filtered and then data sliced to provide a digital message that corresponds to a demodulated version of the ASK modulated message.

According to another embodiment of the present invention, the single receiver is capable of selectively demodulating either of the FSK and the ASK messages. According to another aspect of the invention, any direct current (DC) component of the RSSI signal is removed. According to a different aspect of the invention, the step of filtering the RSSI signal includes the step of low-pass filtering the RSSI signal.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which:

FIGS. 3A-3B are block diagrams including signal designations of an exemplary receiver and processor, respectively, utilized in the receiver system of FIGS. 2A-2B.

DESCRIPTION OF THE PREFERRED EMBODIMENTS

Figure 1:
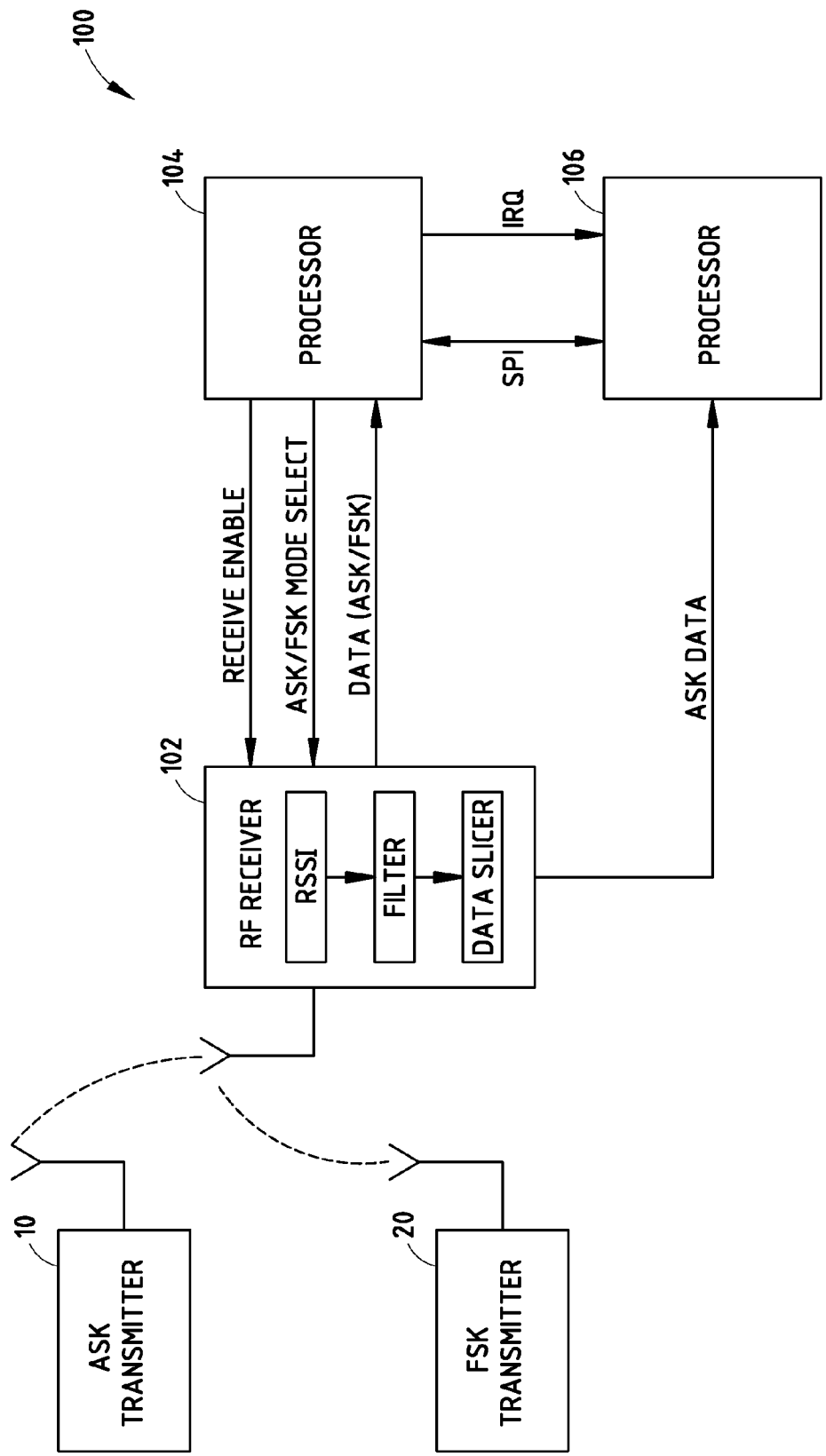
FIG. 1 is an electrical block diagram of a communication system constructed according to one embodiment of the present invention.

Today, there are numerous single integrated circuit (IC) receivers that are capable of receiving both amplitude shift keying (ASK) and frequency shift keying (FSK) modulated messages. However, these IC receivers do not provide the capability to demodulate both ASK and FSK modulated messages simultaneously. That is, an available data channel can only provide either ASK data or FSK data at any one time, depending upon whether an ASK mode or an FSK mode is selected. As such, it should be appreciated that when ASK and FSK messages are overlapping, a single receiver constructed according to the prior art cannot simultaneously receive both ASK and FSK messages.

Overlapping of messages may frequently occur as a typical RKE and/or TPM message includes more than one packet, due to polling strategies generally employed by a given receiver. As such, a single receiver may be required to receive multiple packets in order to obtain a complete message from an RKE and/or TPM transmitter. In a typical TPM and/or RKE system, there may be a relatively long interval between packets and, in general, the duration of the intervals can vary significantly. For example, in one TPM application, the packet interval can vary from 100 mS to 700 mS.

It should be appreciated that receiving other messages during a given packet interval is not problematic when both the RKE and TPM systems utilize the same modulation scheme. However, when different modulation schemes are employed by an RKE and TPM system deployed within the same motor vehicle, a single receiver constructed according to the prior art is not able to simultaneously demodulate the received signals. For example, when a single receiver detects an FSK message, it is required to stay in FSK mode for a next FSK packet and, as such, the receiver is blind to an incoming ASK message that may come during a relevant time period. As a result, messages may be missed. Additionally, a single receiver that is in ASK mode will be blind to any FSK messages while it is anticipating a next ASK packet.

According to the present invention, both ASK and FSK messages can be received simultaneously by virtually any receiver that is capable of demodulating FSK messages and that provides an indication of a combined strength of simultaneously received signals. Typically, a signal that indicates the combined strength of simultaneously received signals has been referred to as a received signal strength indicator (RSSI) signal in most currently available RF receiver integrated circuits (ICs). According to the present invention, due to the nature of an ASK message, the RSSI signal can be filtered, amplified and sliced to provide a second data channel dedicated to an ASK modulated message. The communication system can then use the receiver in FSK mode, as the primary data channel, and provide a secondary data channel in ASK mode such that both FSK and ASK modulated signals can be simultaneously received. It should be appreciated that such a single receiver, with associated circuitry, provides the functionality of two stand-alone receivers that operate in ASK and FSK mode.

As is shown in FIG. 1, an RF receiver system 100 communicates with an ASK transmitter 10 and an FSK transmitter 20. The system 100 includes a single RF receiver 102 that may simultaneously receives an ASK message transmitted from the ASK transmitter 10 and an FSK message transmitted from the FSK transmitter 20. The RF receiver 102 is coupled to a processor 104, which controls, via a receiver enable signal, whether RF power is provided to the RF receiver 102 and controls, by toggling a signal provided on an ASK/FSK mode select line, whether the RF receiver is in an ASK or an FSK mode. The RF receiver 102 provides ASK or FSK data to the processor 104, depending upon whether the processor 104 has selected the ASK mode or the FSK mode, utilizing the ASK/FSK mode select line. The RF receiver 102 also provides information, which is processed to provide ASK data, to a second processor 106. The first processor 104 and the second processor 106 communicate over a serial peripheral interface (SPI) line and the processor 104 may provide interrupt requests to the processor 106, via an interrupt request (IRQ) line.

Figure 2A:
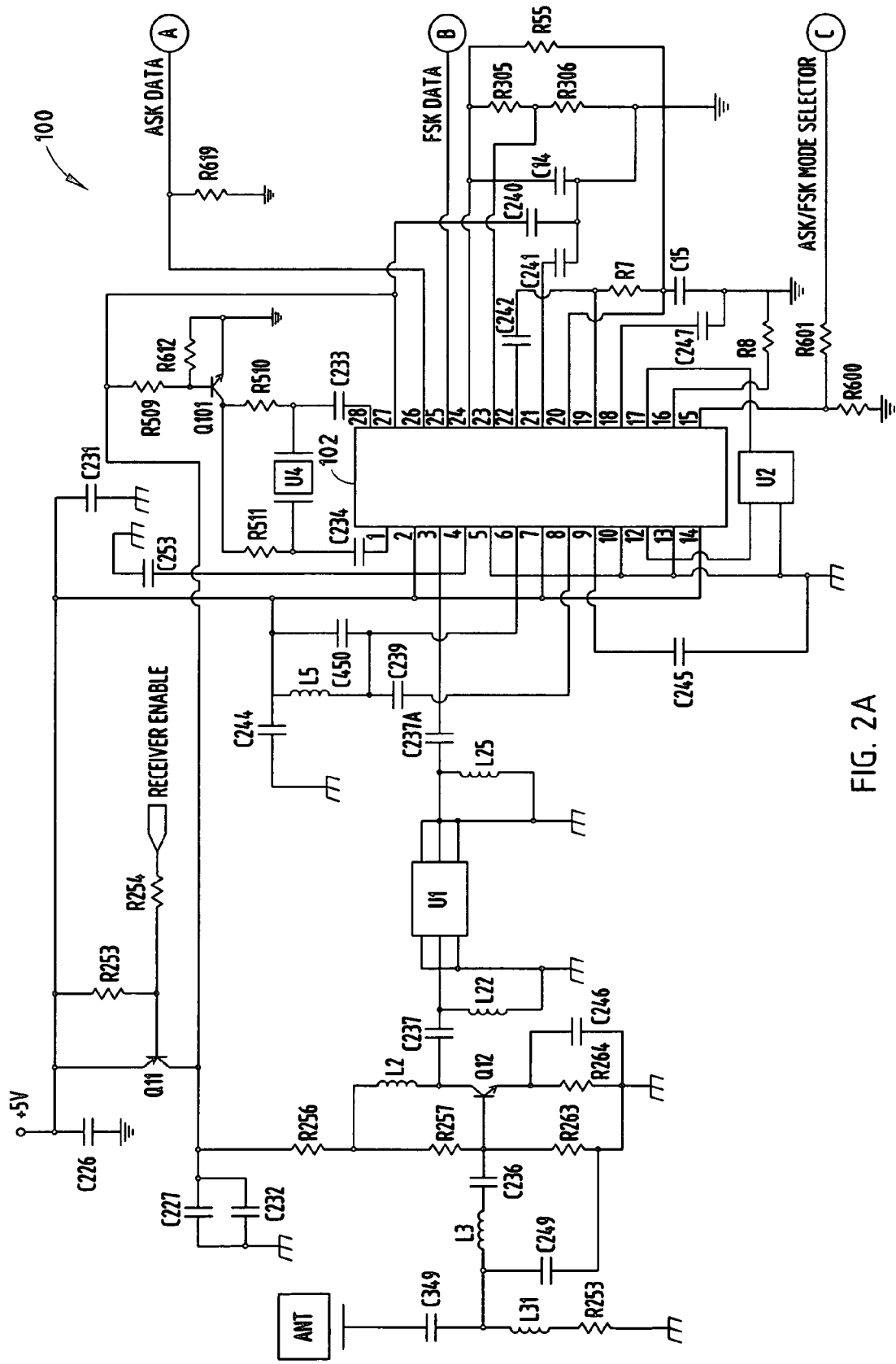
FIGS. 2A-2B depict an electrical schematic of a receiver system for simultaneously demodulating amplitude shift keying (ASK) and frequency shift keying (FSK) modulated messages.
Figure 2B:
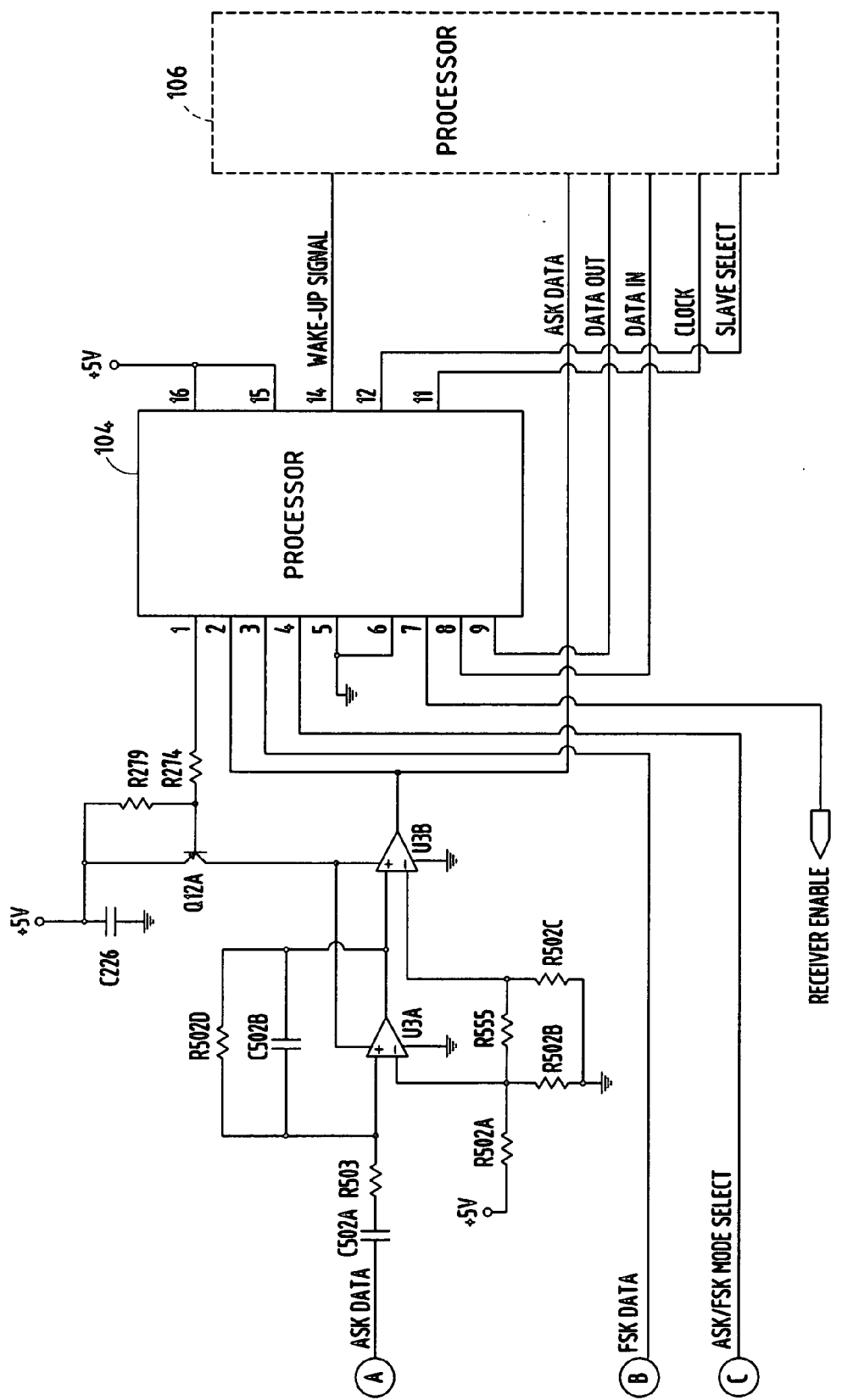

FIGS. 2A and 2B depict an exemplary electrical schematic of the receiver system 100, constructed according to one embodiment of the present invention. As is shown in FIG. 3A, the receiver 102 may be implemented as a TDA5211 manufactured and made commercially available by Infineon Technologies. Signals received through an antenna (ANT) are coupled to a base of an NPN transistor Q12, via a filter network that includes a capacitor C349, an inductor L31, a resistor R253, a capacitor C249, an inductor L3 and a capacitor C236. A resistive divider network, including resistors R256, R257 and R263, biases the base of the transistor Q12.

When a receiver enable signal, which is provided to a base of a PNP transistor Q11, via a current limiting resistor R254, is asserted, a power supply +5V provides power to one side of the resistor 256. The receiver enable signal, which is provided by the processor 104, determines whether the receiver 102 receives power. The processor 104 (see FIG. 3B) may be implemented as a PIC microcontroller manufacture and made commercially available by Microchip Technology. A resistor R253 pulls the base of the transistor Q11 high when the receiver enable signal is not asserted. An inductor L2 is coupled between a collector and the base, via the resistor R257, of the transistor Q12, which amplifies signals received by the antenna (ANT). The collector of the transistor Q12 is capacitively coupled to an input of filter circuit U1 and an output of the filter circuit U1 is capacitively coupled to an LNI input (pin 3) of the receiver 102.

The receiver 102 provides ASK data on a PDO output (pin 26) and FSK data on a DATA output (pin 25). The FSK data is provided to an input of the processor 104 and the ASK data is provided to a non-inverting input of operational amplifier U3A (see FIG. 2B), via serially coupled capacitor C502A and resistor R503. A resistor R502D and a capacitor C502B are coupled in parallel between the non-inverting input of the operational amplifier U3A and an output of the operational amplifier U3A. The operational amplifier U3A and its associated circuitry acts as a low-pass filter for the ASK data.

The output of the operational amplifier U3A is coupled to a non-inverting input of the operational amplifier U3B, which receives its power via transistor Q12A, when the transistor Q12A is turned on by the processor 104. A base of the transistor Q12 is coupled to an output (pin 1) of the processor 104, via a base current limiting resistor R274. A pull-up resistor R279 is coupled between the base and an emitter of the transistor Q12A. A capacitor C226 filters the power, from the power supply +5V, provided to the emitter of the transistor Q12A. An output of the operational amplifier U3B is coupled to a VCC input (pin 2) of the processor 104 and an ASK Data input of the processor 106.

Accordingly, a receiver system has been described herein that utilizes a single RF receiver to demodulate ASK and FSK messages simultaneously. The receiver system is particularly advantageous when implemented in an automotive environment where one communication system, e.g., a TPM system, uses ASK modulation and another communication system, e.g., an RKE system, uses FSK modulation.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A method for utilizing a single receiver to simultaneously receive and demodulate both amplitude shift keying (ASK) messages and frequency shift keying (FSK) messages, comprising the steps of:
    receiving a first message, wherein the first message is a frequency shift keying (FSK) modulated message;
    receiving a second message, wherein the second message is an amplitude shift keying (ASK) modulated message, and wherein the second message is received during at least a portion of the first message;
    using a single receiver to selectively demodulate the FSK and ASK modulated messages, wherein the single receiver provides a received signal strength indicator (RSSI) signal that provides an indication of a combined strength of the first and second messages;
    filtering the RSSI signal; and
    data slicing the filtered RSSI signal to provide a digital message, wherein the digital message corresponds to a demodulated version of the ASK modulated message.

2. The method of claim 1, further including the step of:
    removing any direct current (DC) component from the RSSI signal.

3. The method of claim 1, wherein the step of filtering the RSSI signal includes the step of:
    low-pass filtering the RSSI signal.

4. A communication system, comprising:
    a first transmitter, wherein the first transmitter transmits a first message that is a frequency shift keying (FSK) modulated message;
    a second transmitter, wherein the second transmitter transmits a second message that is an amplitude shift keying (ASK) modulated message, and wherein the second message is transmitted during at least a portion of the first message; and a radio frequency (RF) receiver in communication with the first and second transmitters, wherein the receiver is configured to receive and selectively demodulate both of the first and second messages simultaneously, and the receiver provides a received signal strength indicator (RSSI) signal that provides an indication of a combined strength of the first and second messages and the receiver further comprises:

a first filter for filtering the RSSI signal; and data slicer for data slicing the filtered RSSI signal to provide the digital message, wherein the digital message corresponds to demodulated version of the ASK modulated message.

5. The system of claim 4, wherein the receiver further includes:

a second filter for removing any direct current (DC) component from the RSSI signal.

6. The system of claim 4, wherein the first filter is a low-pass filter.

7. A communication system, comprising:

a first transmitter, wherein the first transmitter transmits a first message that is a frequency shift keying (FSK) modulated message;

a second transmitter, wherein the second transmitter transmits a second message that is an amplitude shift keying (ASK) modulated message, and wherein the second message is transmitted during at least a portion of the first message; and a radio frequency (RF) receiver in communication with the first and second transmitters, wherein the receiver is configured to receive and selectively demodulate both of the first and second messages simultaneously, and wherein the receiver provides a received signal strength indicator (RSSI) signal that provides an indication of a combined strength of the first and second messages, wherein the receiver further comprises:

a first filter for filtering the RSSI signal; and data slicer for data slicing the filtered RSSI signal to provide a digital message, wherein the digital message corresponds to a demodulated version of the ASK modulated message.

8. The system of claim 7, wherein the receiver further includes:

a second filter for removing any direct current (DC) component from the RSSI signal.

9. The system of claim 7, wherein the first filter is a low-pass filter.

10. A receiver system, comprising:

a radio frequency (RF) receiver in communication with first and second transmitters, wherein the first transmitter transmits a first message in a frequency shift keying (FSK) modulated format and the second transmitter transmits a second message in an amplitude shift keying (ASK) modulated format, and wherein the receiver is configured to receive and selectively demodulate the first and second messages and provide a received signal strength indicator (RSSI) signal that provides an indication of a combined strength of the first and second messages;

a first filter coupled to the receiver, the first filter filtering the RSSI signal; and data slicer coupled to the first filter, the data slicer data slicing the filtered RSSI signal to provide a digital message, wherein the digital message corresponds to a demodulated version of the ASK modulated message.

11. The system of claim 10, further including:

a second filter for removing any direct current (DC) component from the RSSI signal.

12. The system of claim 10, wherein the first filter is a low-pass filter.

13. The method of claim 1 further comprising the step of providing an enable signal to the receiver in order for the receiver to be operational.

14. The method of claim 1 further comprising the step of communicating the demodulated ASK signal from the receiver to an operational amplifier, wherein the operational amplifier low-pass filters the demodulated ASK signal.

15. The method of claim 14 further comprising the step of communicating the filtered ASK signal to a second operational amplifier that is in communication with a first processor and a second processor, such that the filtered ASK signal is communicated to the second processor based upon a signal received by the second operational amplifier from the first processor.

16. The method of claim 1 further comprising the step of providing a signal from a first processor, wherein the demodulated ASK signal is communicated to a second processor based upon the signal provided by the first processor.

* * * * *